United States Patent [19]
Park

[11] Patent Number: 6,138,005
[45] Date of Patent: Oct. 24, 2000

[54] METHOD FOR VERIFYING PERSONALIZATION IN MOBILE RADIO TERMINAL

[75] Inventor: Hyoung-Nae Park, Kyonggi-do, Rep. of Korea

[73] Assignee: Samsung Electronics Co., Ltd., Rep. of Korea

[21] Appl. No.: 09/009,865

[22] Filed: Jan. 22, 1998

[30]     Foreign Application Priority Data

Jan. 22, 1997 [KR] Rep. of Korea .......................... 97-1752

[51] Int. Cl.$^7$ ....................................................... H04M 1/66
[52] U.S. Cl. ............................................. 455/411; 455/558
[58] Field of Search ..................................... 455/410, 411, 455/558, 432, 435, 551, 552; 380/23

[56]                References Cited

U.S. PATENT DOCUMENTS

| | | |
|---|---|---|
| 5,444,764 | 8/1995 | Galecki . |
| 5,875,404 | 2/1999 | Messiet ................................. 455/411 |
| 5,933,773 | 8/1999 | Barvesten .............................. 455/411 |
| 5,956,633 | 9/1999 | Janhila ................................... 455/411 |

FOREIGN PATENT DOCUMENTS

WO 95/01695   1/1995   WIPO ........................... H04M 11/00

*Primary Examiner*—Reinhard J. Eisenzopf
*Assistant Examiner*—Sam Bhattacharya
*Attorney, Agent, or Firm*—Dilworth & Barrese

[57]                ABSTRACT

A method is provided for verifying personalization for a mobile radio terminal having a detachable Subscriber identity module (SIM) card. The method includes the step of storing verification mode setting information in the terminal pertaining to verification modes that include a normal and a forced verification mode. The information is then accessed to determine whether the mode setting information pertains to the forced verification mode, when a predefined condition exists. When the mode setting information is set to the forced verification mode, it is determined whether a SIM lock code stored in the mobile radio terminal is identical to a SIM lock code stored in the SIM card. When the SIM lock codes are not identical, it is determined whether a password input by a user is identical to a password stored in the terminal. Additionally, the method includes the step of blocking the terminal when the passwords are not identical. The method may be performed at the request of the user, or upon power-on of a terminal, or when a SIM card is inserted into the powered terminal or replaced with a new one.

17 Claims, 4 Drawing Sheets

METHOD FOR VERIFYING PERSONALIZATION IN MOBILE RADIO TERMINAL

BACKGROUND OF THE INVENTION

1. Field of the Invention

The present invention relates to a Global System for Mobile (GSM) communications and, more specifically, to a method for detecting (or verifying) relation between a mobile radio terminal and a subscriber identity module (SIM) card in a GSM-based system.

2. Description of the Related Art

In general, a Global System for Mobile communications (hereinafter, referred to as "GSM") terminal performs a personalization function for detecting (or verifying) the relation between a mobile radio terminal and a subscriber identity module (hereinafter, referred to as "SIM") card. The personalization function is commonly called a "SIM lock" function. The SIM lock function consists of: a SIM lock verification procedure for checking whether the SIM card coincides with the mobile radio terminal into which the SIM card is inserted; and a password verification procedure for checking whether a password input by the user is identical to a password stored in the mobile radio terminal. The latter is employed when a user, possessing his or her own SIM card, utilizes another person's radio terminal. The password verification procedure allows the bill for the telephone charges to be forwarded to the person possessing the SIM card. In such a case, it is necessary to check the password, since a SIM lock code stored in the radio terminal does not coincide with a SIM lock code stored in the SIM card (thus, rendering the SIM lock verification procedure ineffective).

FIG. 1 shows a block diagram of a general GSM terminal. A central processing unit (CPU) 70 controls the overall operations of the mobile radio terminal. A memory 94 consists of an EEPROM (Electrically Erasable and Programmable Read Only Memory) for storing a program and initial service data, and a RAM (Random Access Memory) for temporarily storing data generated during operation of the mobile radio terminal. A keypad 92 generates key data for performing various functions of the mobile radio terminal including a dialing function, and provides the key data to the CPU 70. A CODEC 80, consisting of an encoder and a decoder, is connected to a speaker 82 and a microphone 84. The encoder of CODEC 80 converts an analog voice signal into a digital signal for transmission via Code Division Multiple Access (CDMA), and the decoder converts the received digital signal into the analog voice signal. A duplexer 10, connected to an antenna 12, separates a transmission Radio Frequency (RF) signal and a reception RF signal. A receiver 20 connected to duplexer 10 receives the RF signal, and a demodulator 50 detects the received signal from receiver 20 to transfer an audio signal to CODEC 80 and the received data to CPU 70. A modulator 60 modulates transmission audio signal from CODEC 80. A transmitter 30 modulates the transmission audio signal from modulator 60 and the transmission data from CPU 70, and transfers them to duplexer 10. A channel mixer 40, under the control of CPU 70, receives and transmits data for designating transmission and reception channels. The CODEC 80 communicates with CPU 70. A display 90 displays the various states of the mobile radio terminal. An IC (Integrated Circuit) card module 95, which is a data storage device in the form of a card, stores personal and system information.

FIG. 2 is a flow chart illustrating a prior art method for verifying relation between the mobile radio terminal and the SIM card. First, CPU 70 starts the SIM lock verification procedure (step 2*a*) if: the mobile radio terminal is powered up; the SIM card is inserted into card module 95 of the powered terminal; or the currently utilized SIM card is replaced with a new SIM card. Next, CPU 70 reads the "SIM Lock Function" setting information stored at a specified address in the EEPROM of memory 94 (step 2*b*).

Subsequently, CPU 70 checks whether or not the "SIM Lock Function" setting information is in an "ON" (or "SELECT") state (step 2*c*). If the "SIM Lock Function" setting information is in an "OFF" (or "NON-SELECT") state, CPU 70 terminates the procedure. However, if the "SIM Lock Function" setting information is in the "ON" state, CPU 70 proceeds to step 2*d*.

Then, CPU 70 reads the SIM lock code from the EEPROM of memory 94, and compares it with the SIM lock code stored in the SIM card inserted into IC card module 95, and checks whether or not the two SIM lock codes are identical (steps 2*d* and 2*e*). The SIM lock code is used to verify the SIM lock. If the two SIM lock codes are identical, CPU 70 terminates the verification procedure. However, if the SIM lock codes are not identical, CPU 70 proceeds to step 2*f*.

Next, CPU 70 compares the password input by the user with the password stored at a specified address in the EEPROM of memory 94, and checks whether or not the two passwords are identical (steps 2*f* and 2*g*). If the two passwords are identical, CPU 70 proceeds to step 2*k*. At step 2*k*, CPU 70 changes the "SIM Lock Function" setting information to the "OFF" state and then, terminates the procedure. However, if the passwords are not identical, CPU 70 proceeds to step 2*h*.

At step 2*h*, CPU 70 reads the "Residual Retry Number for SIM Lock Verification" information in the EEPROM. Then, CPU 70 checks whether or not the residual retry number is greater than zero (0) (step 2*i*). If the residual retry number is greater than zero, CPU 70 returns to step 2*f* to repeat the comparison of the passwords. However, if the residual retry number is not greater than zero, CPU 70 proceeds to step 2*j*. At step 2*j*, CPU 70 blocks the mobile radio terminal (or renders the terminal inoperable). In this manner, a fraudulent use of the mobile radio terminal by an unauthorized person is prevented.

The conventional mobile radio telephone verifies the SIM lock code and the password only when the SIM lock function is selected. Furthermore, if the "SIM Lock Function" setting information is switched from the "ON" state to the "OFF" state, the mobile radio telephone will not perform the SIM lock verification procedure even if the system is re-powered (re-started) or the SIM card is re-inserted into IC card module 95, or replaced with a new SIM card. However, it is to be appreciated that the user may require the SIM lock verification procedure to be performed at any time. Nonetheless, in the aforementioned circumstances, the conventional mobile radio telephone disadvantageously cannot perform the SIM lock verification procedure.

SUMMARY OF THE INVENTION

It is an object of the present invention to provide a method for forcing the performance of a SIM lock verification procedure irrespective of the state of the "SIM Lock Function" setting information. The procedure may be performed at the request of the user, upon power-on of a terminal, or when a SIM card is inserted into the powered terminal or replaced with a new one.

To achieve the above and other objects, a method is provided for verifying personalization for a mobile radio terminal having a detachable Subscriber identity module (SIM) card. The method includes the step of storing verification mode setting information in the terminal pertaining to verification modes that include a normal and a forced verification mode. The method also includes the step of accessing the information to determine whether the mode setting information pertains to the forced verification mode, when a predefined condition exists. Also included is the step of determining whether a SIM lock code stored in the mobile radio terminal is identical to a SIM lock code stored in the SIM card, when the mode setting information is set to the forced verification mode. When the SIM lock codes are not identical, an additional step of determining whether a password input by a user is identical to a password stored in the terminal is performed. Additionally, the method includes the step of blocking the terminal when the passwords are not identical.

In an alternative embodiment, the SIM card memory stores the specific user's password in addition to the SIM lock codes. Then, if the user attempts to use a mobile terminal other than their dedicated terminal (i.e., someone else's mobile terminal), the SIM lock codes will not match and the user input password is compared with that stored on the SIM card to complete the call and enable billing to the user.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

An embodiment of the present invention will be described in detail hereinbelow with reference to the accompanying drawings. In order to facilitate a comprehensive understanding, the present invention will be illustratively described with reference to a specific embodiment. In the following description, well-known functions or constructions which may obscure the present invention in unnecessary detail are not described in detail.

Figure 1:
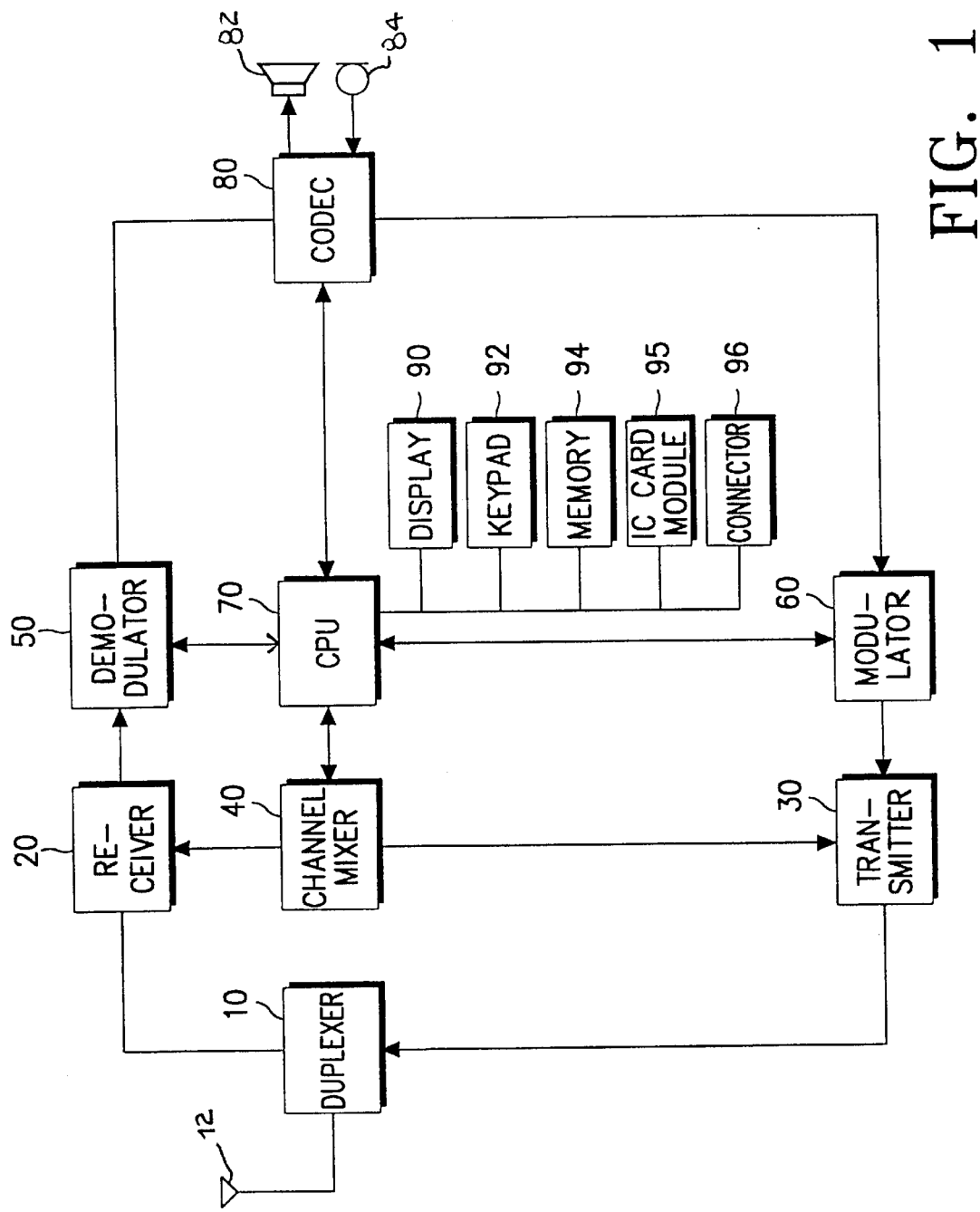
FIG. 1 is a schematic block diagram of a general GSM terminal.
Figure 2:
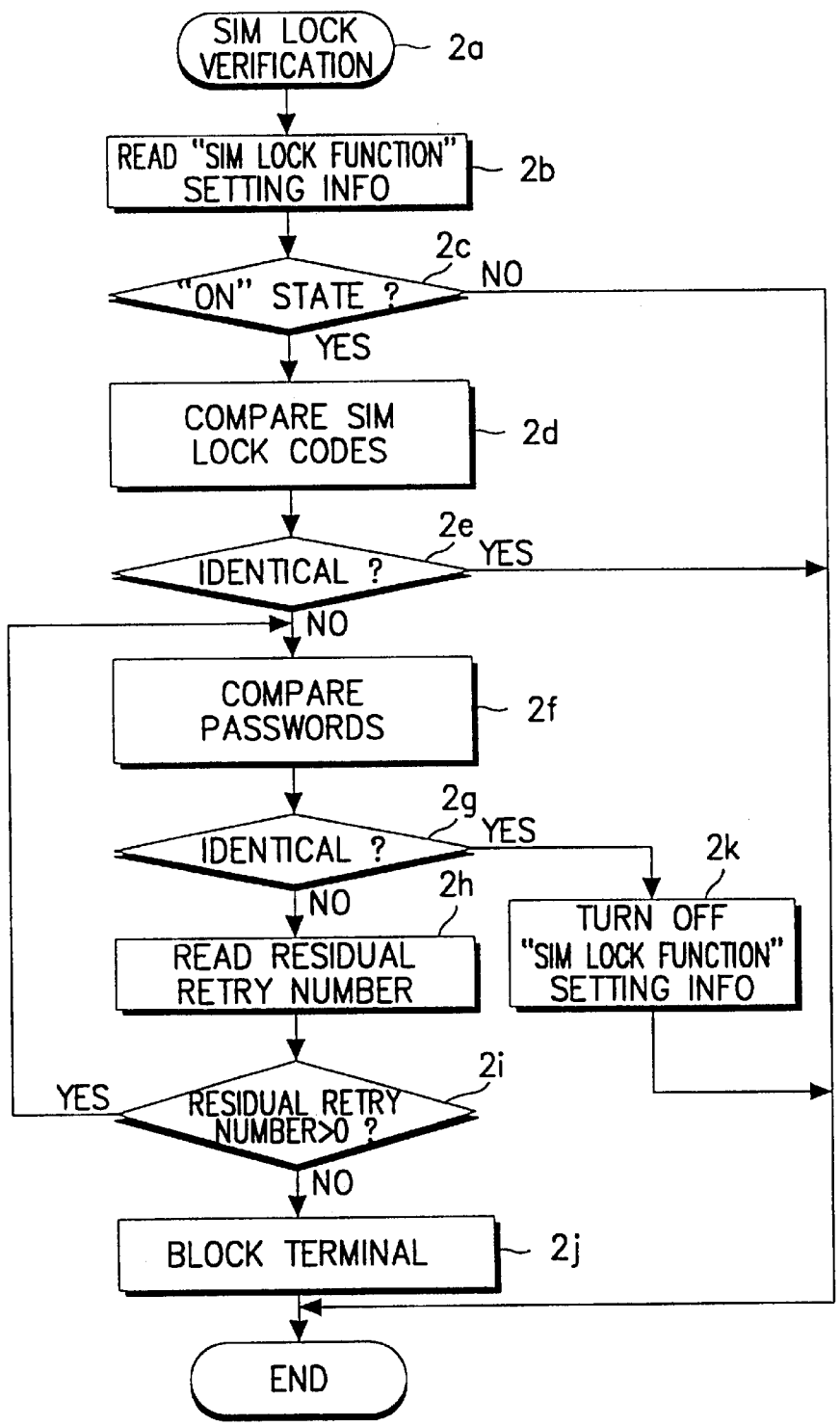
FIG. 2 is a flow chart illustrating a method for verifying the relation between a mobile radio terminal and a SIM card according to the prior art.
Figure 3:
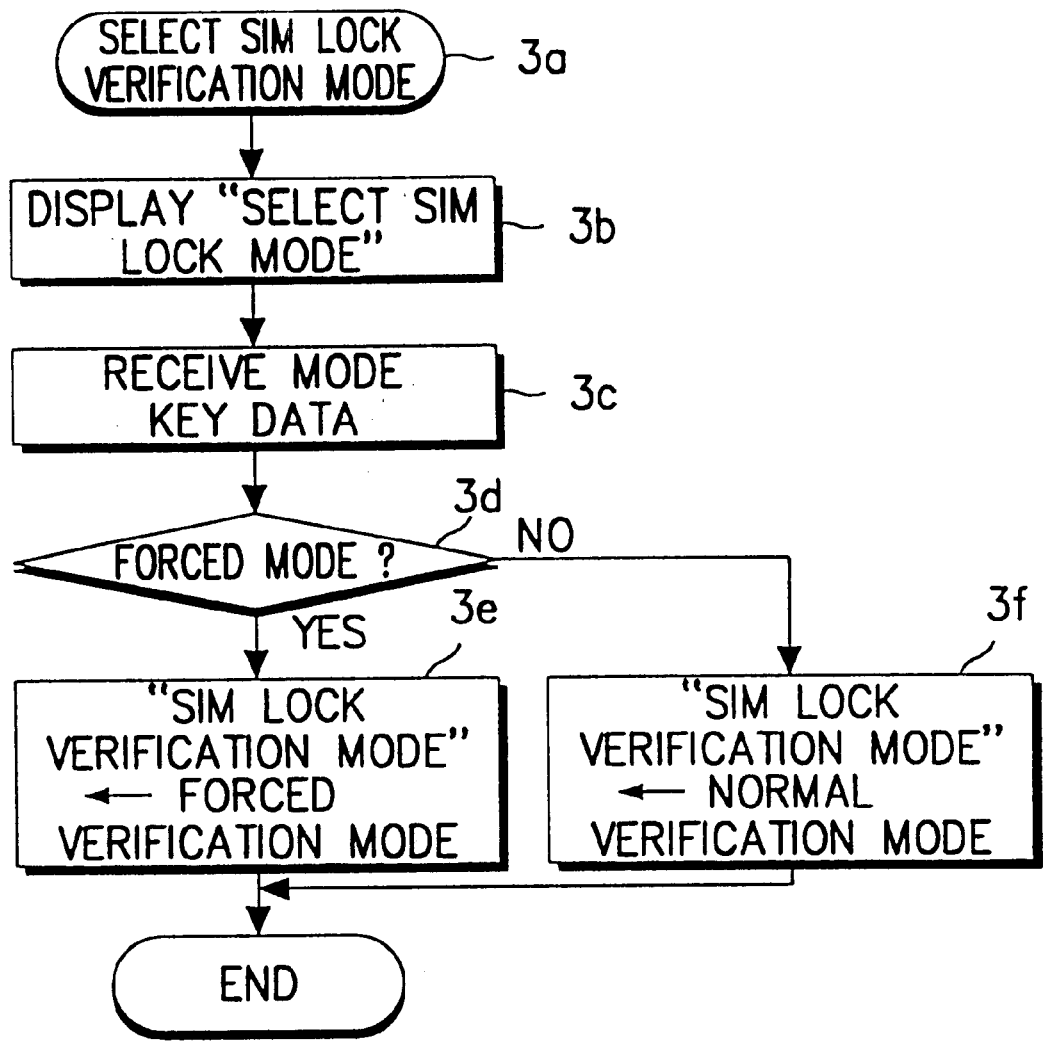
FIG. 3 is a flow chart illustrating a method for selecting a SIM lock verification mode according to an embodiment of the present invention.

FIG. 3 is a flow chart illustrating a method for selecting a SIM lock verification mode according to an embodiment of the present invention. Referring to FIGS. 1 and 3, a user selects a SIM lock verification mode by using keypad 92 (step 3a). Subsequently, CPU 70 displays a message "Select SIM Lock Verification Mode" on display 90 (step 3b).

Accordingly, the user will depress a mode selection key in response to the displayed inquiry (step 3c). CPU 70 then scans keypad 92 to recognize the key depressed, and checks whether or not the depressed key corresponds to a "Normal" verification mode or a "Forced" verification mode (step 3d).

If the depressed key corresponds to the "Normal" verification mode, CPU 70 proceeds to step 3f to store information representative of the "Normal" verification mode at an address for the "SIM Lock Verification Mode" information. However, if the depressed key corresponds to the "Forced" verification mode, CPU 70 proceeds to step 3e to store information representative of the "Forced" verification mode at the address for the "SIM Lock Verification Mode" information.

Figure 4:
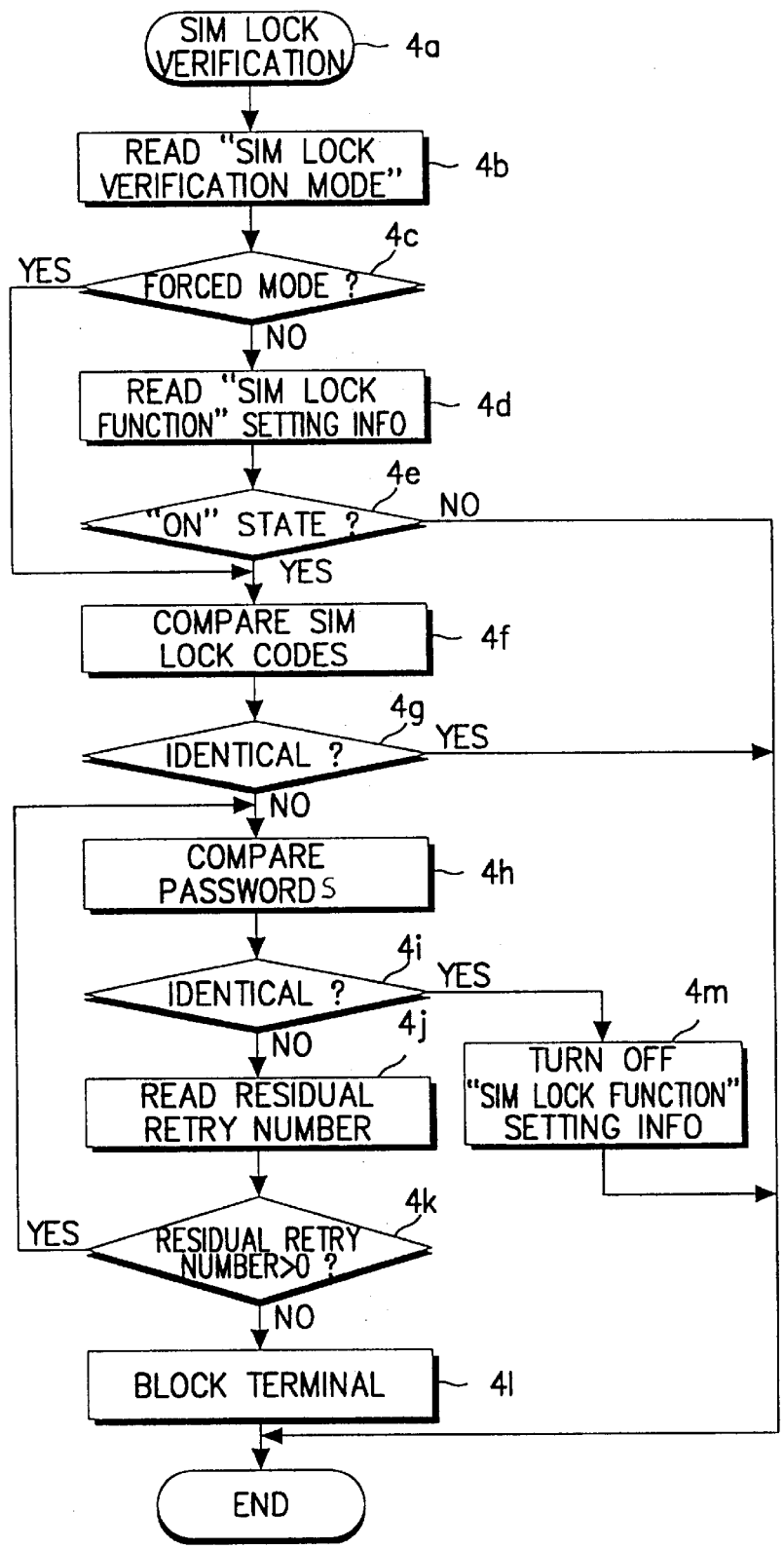
FIG. 4 is a flow chart illustrating a method for verifying the relation between a mobile radio terminal and a SIM card according to an embodiment of the present invention.

FIG. 4 is a flow chart illustrating a method for verifying the relation between the mobile radio terminal and the SIM card according to an embodiment of the present invention. Referring to FIGS. 1 and 4, if the user powers up the mobile radio terminal or inserts the SIM card into IC card 95 of the powered terminal (or replaces the SIM card with a new one), CPU 70 senses these conditions and starts the SIM lock verification procedure (step 4a). Then, CPU 70 reads the information stored at the address for the "SIM Lock Verification Mode" information in the EEPROM of memory 94 (step 4b).

Next, CPU 70 checks whether or not the stored information corresponds to the "Forced" verification mode (step 4c). If the information corresponds to the "Forced" verification mode, CPU 70 proceeds to step 4f to perform the SIM lock verification procedure. However, if the information does not correspond to the "Forced" verification mode, CPU 70 proceeds to step 4d.

At step 4d, CPU 70 reads the "SIM lock function" setting information, and checks whether or not the "SIM Lock Function" setting information stored at a specified address in the EEPROM is in the "ON" state (step 4e). If the "SIM Lock Function" setting information is not selected (i.e., is not in the "ON" state), CPU 70 terminates the procedure. However, if the "SIM Lock Function" setting information is selected (i.e., is in the "ON" state), CPU 70 proceeds to step 4f.

CPU 70 reads the SIM lock code from the EEPROM, compares it with the SIM lock code stored in the SIM card inserted into IC card module 95, and checks whether the two SIM lock codes are identical (steps 4f and 4g). If the codes are identical, CPU 70 terminates the procedure. However, if the codes are not identical, CPU 70 proceeds to step 4h.

When the SIM lock codes are not identical, CPU 70 compares the password input by the user with the password stored at a specified address of the EEPROM of memory 94, and checks whether the two passwords are identical (steps 4h and 4i). Alternatively, CPU 70 could compare the password input by the user with a password stored in the SIM card, and check whether the two passwords are identical (steps 4h and 4i). If the passwords are identical, CPU 70 proceeds to step 4m. At step 4m, CPU 70 sets the "SIM Lock Function" setting information to the "OFF" state (i.e., "NON-SELECT" state) and then, terminates the procedure. However, if the passwords are not identical, CPU 70 proceeds to step 4j.

At step 4j, CPU 70 reads the "Residual Retry Number for SIM Lock Verification" information in the EEPROM. Next, CPU 70 checks whether or not the residual retry number is greater than zero (step 4k). If the residual retry number is greater than zero, CPU 70 returns to the step 4h to repeat comparison of the passwords. However, if the residual retry number is not greater than zero, then CPU 70 proceeds to step 4l and blocks the mobile radio terminal. In this manner, fraudulent use of the telephone number by an unauthorized person is prevented.

As apparent from the foregoing, the method of the present invention forces the verification of the relation between the mobile radio terminal and the SIM card irrespective of the setting state of the SIM lock function, when the power is on or when the SIM card is inserted into the mobile radio terminal. Accordingly, a fraudulent use of the mobile radio terminal by an unauthorized person is prevented.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for verifying personalization for a mobile radio terminal having a detachable Subscriber identity module (SIM) card, comprising the steps of:

storing verification mode setting information in the terminal pertaining to verification modes that include a normal and a forced verification mode;

accessing the setting information to determine whether the mode setting information pertains to the forced verification mode, when a predefined condition exists;

determining whether a SIM lock code stored in the mobile radio terminal is identical to a SIM lock code stored in the SIM card, when the mode setting information is set to the forced verification mode, regardless of the state of the normal verification mode;

determining whether a password input by a user is identical to a password stored in the terminal, when the SIM lock codes are not identical; and blocking the terminal, when the passwords are not identical.

2. The method of claim 1, wherein the verification mode setting information and the password stored in the mobile radio terminal are stored in an internal memory of the mobile radio terminal.

3. The method of claim 2, wherein the verification mode setting information is stored at a specified address in the internal memory of the mobile radio terminal.

4. The method of claim 1, wherein the predefined condition is that the mobile radio terminal is powered on.

5. The method of claim 1, wherein the predefined condition is that the SIM card is inserted into the mobile radio terminal.

6. The method of claim 1, wherein the predefined condition is that the SIM card is replaced with a new SIM card.

7. The method of claim 1, wherein the normal and the forced verification modes are received via a user interface.

8. A method for verifying a relation between a Global System for Mobile (GSM) communication terminal and a SIM card when a predefined condition exists, comprising the steps of:

accessing the terminal to determine whether mode setting information pertains to a forced verification mode,;

if the mode setting information does not pertain to a forced verification mode, accessing the terminal to determine whether the mode setting information pertains to a normal verification mode;

if the mode setting information pertains to one of the forced verification mode and the normal verification mode, performing the additional steps of:

determining whether a SIM lock code stored in the terminal is identical to a SIM lock code stored in the SIM card;

determining whether a password input by a user is identical to a password stored in the terminal, when the SIM lock codes are not identical;

accessing the terminal to unselect the function for relation verification and terminating the method for verifying relation, when the passwords are identical; and blocking the terminal, when the passwords are not identical.

9. The method as claimed in claim 8, further comprising the steps of:

accessing the terminal to determine if a residual retry number is greater than zero, when the passwords are not identical; and re-comparing the passwords when the residual retry number is greater than zero.

10. The method of claim 8, wherein the mode setting information, the password stored in the mobile radio terminal, and the residual retry number are stored in an internal memory of the mobile radio terminal.

11. The method as claimed in claim 8, further comprising the step of terminating the method for verifying relation, when the function for relation verification is not selected.

12. The method of claim 8, wherein the normal and the forced verification modes are set by the user.

13. A method for verifying personalization for a mobile radio terminal having a detachable Subscriber identity module (SIM) card, comprising the steps of:

storing verification mode setting information in the terminal pertaining to verification modes that include a normal and a forced verification mode;

accessing the setting information to determine whether the mode setting information pertains to the forced verification mode, when a predefined condition exists;

determining whether a SIM lock code stored in the mobile radio terminal is identical to a SIM lock code stored in the SIM card, when the mode setting information is set to the forced verification mode, regardless of the state of the normal verification mode;

determining whether a password input by a user is identical to a password stored in the SIM card, when the SIM lock codes are not identical; and blocking the terminal, when the passwords are not identical.

14. The method of claim 13, wherein the verification mode setting information stored in the mobile radio terminal is stored in an internal memory of the mobile radio terminal and the password stored in the SIM card is stored in an internal memory of the SIM card.

15. The method of claim 14, wherein the verification mode setting information is stored at a specified address in the internal memory of the mobile radio terminal.

16. The method of claim 13, wherein the predefined condition is selected from the group consisting of the mobile radio terminal being powered on, the SIM card being inserted into the mobile radio terminal, and the SIM card being replaced with a new SIM card.

17. The method of claim 13, wherein the normal and the forced verification modes are received via a user interface.

* * * * *